United States Patent
Payangapadan et al.

(10) Patent No.: US 9,145,214 B2
(45) Date of Patent: Sep. 29, 2015

(54) AUXILIARY POWER UNIT INLET DOOR HAVING OPENINGS FORMED THEREIN

(71) Applicant: HONEYWELL INTERNATIONAL INC., Morristown, NJ (US)

(72) Inventors: Murali Krishnan Payangapadan, Karnataka (IN); Vunnam Kiran, Andhra Pradesh (IN); Lavan Kumar Gundeti, Andhra Pradesh (IN); Yogendra Yogi Sheoran, Scottsdale, AZ (US); Bruce Dan Bouldin, Phoenix, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 110 days.

(21) Appl. No.: 14/063,324

(22) Filed: Oct. 25, 2013

(65) Prior Publication Data

US 2015/0115099 A1    Apr. 30, 2015

(51) Int. Cl.
*B64D 33/02*  (2006.01)
*B64D 41/00*  (2006.01)
*B64C 1/00*   (2006.01)

(52) U.S. Cl.
CPC .............. *B64D 33/02* (2013.01); *B64C 1/0009* (2013.01); *B64D 41/00* (2013.01); *B64D 2033/0213* (2013.01)

(58) Field of Classification Search
CPC ........... B64D 2033/0213; B64D 33/02; B64D 2041/002; B64D 41/00
See application file for complete search history.

(56) References Cited

U.S. PATENT DOCUMENTS

| | | | |
|---|---|---|---|
| 5,263,502 A * | 11/1993 | Dick | 137/360 |
| 6,138,950 A * | 10/2000 | Wainfan et al. | 244/53 B |
| 6,264,137 B1 | 7/2001 | Sheoran | |
| 2001/0025903 A1 | 10/2001 | Weber et al. | |
| 2006/0196993 A1* | 9/2006 | Hein et al. | 244/53 B |
| 2007/0193277 A1* | 8/2007 | Sheoran et al. | 60/802 |
| 2009/0261208 A1* | 10/2009 | Belyew | 244/53 B |

(Continued)

FOREIGN PATENT DOCUMENTS

| | | | |
|---|---|---|---|
| CN | 102777261 A | * | 11/2012 |
| EP | 1767455 A2 | | 3/2007 |
| EP | 2163477 A2 | | 3/2010 |

(Continued)

OTHER PUBLICATIONS

CN 102777261 A—specificaton english machine translation.*
EP Extended Search Report for Application No. 14186490.0 dated Feb. 24, 2015.

*Primary Examiner* — Tien Dinh
*Assistant Examiner* — Alexander V Giczy
(74) *Attorney, Agent, or Firm* — Ingrassia Fisher & Lorenz, P.C.

(57) ABSTRACT

An inlet door system includes a duct, an inlet door, and a plurality of openings. The duct is configured to extend from the auxiliary power unit (APU) to an intake opening formed in an outer surface of an aircraft. The duct includes an inlet port, an outlet port, and a duct sidewall extending between the inlet port and the outlet port. The inlet door includes an inner surface, an outer surface, and an outer peripheral edge between the inner and outer surfaces. The door is rotationally coupled to the duct, and is configured to selectively rotate between a closed position and a plurality of open positions. The openings extend through the inlet door between the inner surface and outer surface, and each opening is disposed adjacent to the outer peripheral edge.

10 Claims, 5 Drawing Sheets

(56) References Cited

U.S. PATENT DOCUMENTS

2009/0272847 A1* 11/2009 Robbins et al. ............ 244/129.5
2013/0081706 A1* 4/2013 Garcia Nevado et al. ... 137/15.1

FOREIGN PATENT DOCUMENTS

| WO | 2004087449 | A2 | 10/2004 |
| WO | 2012155521 | A1 | 11/2012 |

* cited by examiner

AUXILIARY POWER UNIT INLET DOOR HAVING OPENINGS FORMED THEREIN

TECHNICAL FIELD

The present invention generally relates to auxiliary power units (APUs), and more particularly relates to an APU inlet door that has openings formed therein to provide improved performance.

BACKGROUND

Auxiliary power units ("APU") are used in aircraft to provide electrical power and compressed air to various aircraft systems and components. When an aircraft is on the ground, its main source of electrical power and cabin conditioning comes from the APU. In particular, the APU can power the environmental control systems, air drive hydraulic pumps, and the starters for the engines. When an aircraft is in flight, the APU may provide pneumatic and/or electric power to the aircraft.

Typically, APUs are located in the aft section of the aircraft, at or near the tailcone section and include inlet and exhaust ducting that exit through an opening, or cut-out, in the aircraft fuselage to allow sufficient air flow through to the APU. For aircraft on which APUs operate during flight, an inlet air door is typically provided to protect the APU from foreign object damage when not in use and/or during ground movement, and to maximize airflow into the APU when performance or oil cooling at altitude is required. Thus, when the APU is running, either on the ground or in flight, the inlet air door is in an open position.

During in-flight operations of the APU, there is a low pressure wake formation on the backside of the open inlet door, which can create relatively high drag loads. These high drag loads may also induce undesirable amounts of vibration on the door, which can have deleterious structural impact and may reduce over inlet door lifetime.

Hence, there is a need for an APU inlet door that, when open, does not exhibit undesirably high drag loads and/or does not have undesirable amounts of vibration induced therein and/or improves overall inlet door lifetime. The present invention addresses one or more of these needs.

BRIEF SUMMARY

In one embodiment, an inlet door system for providing air to at least an auxiliary power unit (APU) contained within an aircraft includes a duct, an inlet door, and a plurality of openings. The duct is configured to extend from the auxiliary power unit (APU) to an intake opening formed in an outer surface of the aircraft. The duct includes an inlet port, an outlet port, and a duct sidewall extending between the inlet port and the outlet port. The duct sidewall defines an air flow passage between the inlet port and the outlet port. The inlet door includes an inner surface, an outer surface, and an outer peripheral edge between the inner and outer surfaces. The door is rotationally coupled to the duct, and is configured to selectively rotate between a closed position, in which the door seals the air inlet port and prevents air flow into the inlet port, and a plurality of open positions, in which the door does not seal the air inlet and allows air flow into the inlet port. The openings extend through the inlet door between the inner surface and outer surface, and each opening is disposed adjacent to the outer peripheral edge.

In another embodiment, an auxiliary power unit system includes an auxiliary power unit (APU), a duct, an inlet, and a plurality of openings. The APU includes at least an APU air inlet. The duct is coupled to and extends from the APU air inlet, and includes an inlet port, an outlet port, and a duct sidewall extending between the inlet port and the outlet port. The duct sidewall defines an air flow passage between the inlet port and the outlet port. The inlet door includes an inner surface, an outer surface, and an outer peripheral edge between the inner and outer surfaces. The door is rotationally coupled to the duct, and is configured to selectively rotate between a closed position, in which the door seals the air inlet port and prevents air flow into the inlet port, and a plurality of open positions, in which the door does not seal the air inlet and allows air flow into the inlet port. The openings extend through the inlet door between the inner surface and outer surface, and each opening is disposed adjacent to the outer peripheral edge.

In yet another embodiment, an inlet door system for providing air to at least an auxiliary power unit (APU) contained within an aircraft includes a duct, an inlet door, an actuator, and a plurality of openings. The duct is configured to extend from the auxiliary power unit (APU) to an intake opening formed in an outer surface of the aircraft, and includes an inlet port, an outlet port, and a duct sidewall extending between the inlet port and the outlet port. The duct sidewall defines an air flow passage between the inlet port and the outlet port. The inlet door includes an inner surface, an outer surface, and an outer peripheral edge between the inner and outer surfaces. The outer peripheral edge is defined by a front edge, a back edge, a first side edge, and a second side edge. The door is rotationally coupled to the duct, and is configured to selectively rotate between a closed position, in which the door seals the air inlet port and prevents air flow into the inlet port, and a plurality of open positions, in which the door does not seal the air inlet and allows air flow into the inlet port. The actuator is coupled to the inlet door and is configured to selectively move the inlet door between the closed position and one or more of the open positions. The openings extend through the inlet door between the inner surface and outer surface. Each of the openings is disposed adjacent to only the front edge, the first side edge, and the second side edge.

Furthermore, other desirable features and characteristics of the APU inlet door will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
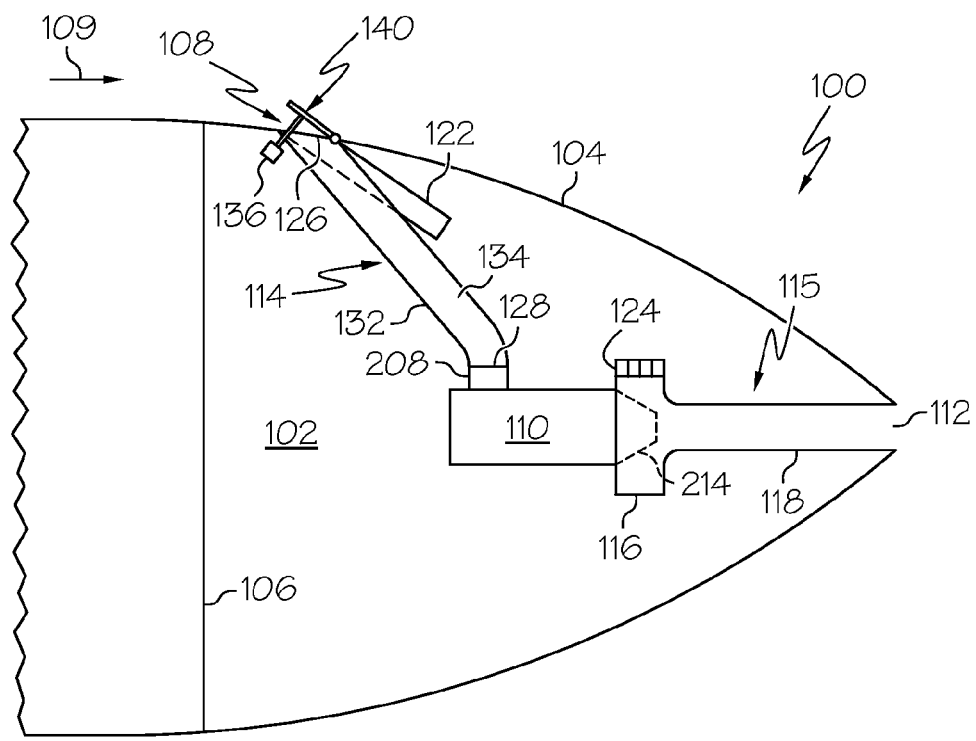
FIG. 1 depicts a cross-sectional schematic of a portion of an aircraft.

Turning now to FIG. 1, a cross-sectional schematic of a portion of an aircraft 100 is depicted. The aircraft 100 includes an auxiliary power unit (APU) compartment 102 that is defined by an exterior surface 104 and a firewall 106. As is generally known, the firewall 106 separates the APU compartment 102 from other sections of the aircraft 100. In the depicted embodiment, the APU compartment 102 is formed in the tailcone section of the aircraft 100. It will be appreciated, however, that this is merely exemplary, and that the APU compartment 102 could be formed in any one of numerous other sections of the aircraft 100. It will additionally be appreciated that, depending on its location in the aircraft 100, the APU compartment 102 may be defined by more than one firewall 106.

No matter its specific location, the APU compartment 102 includes one or more intake openings 108, and an exhaust opening 112. As will be described in more detail further below, the one or more intake openings 108 are configured to selectively receive a flow of inlet air 109, and the exhaust opening 112 provides a point of egress from the APU compartment 102 for APU exhaust and other gasses. The inlet air 109 is selectively supplied to an APU 110 that is mounted within the compartment 102 and, in some embodiments, may also be supplied to the compartment 102 for cooling purposes. Before proceeding further, and for completeness, a brief description of an exemplary APU 110 that may be mounted within the compartment 102 will be provided.

Figure 2:
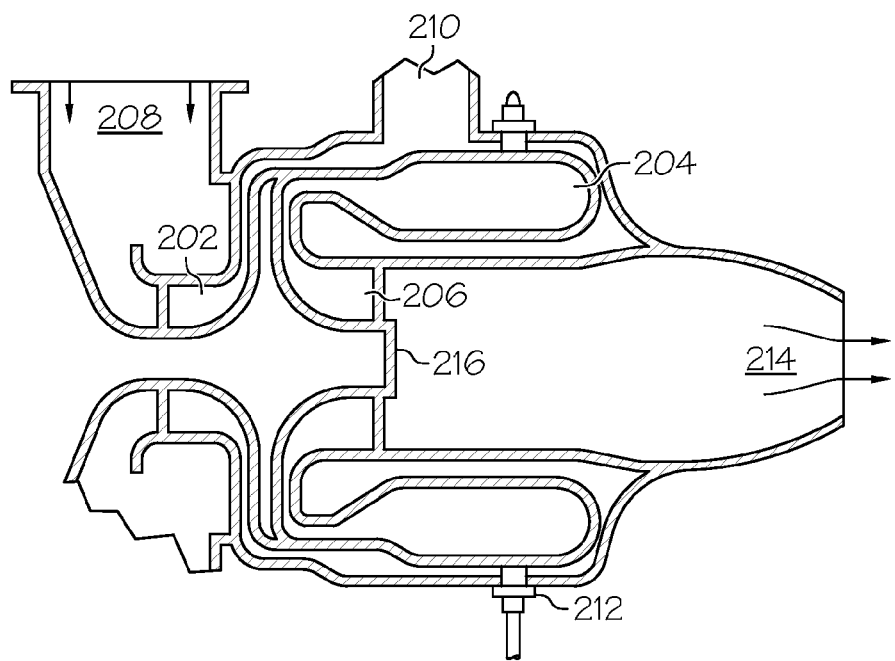
FIG. 2 depicts a simplified cross section view of one embodiment of an auxiliary power unit.
Figure 3:
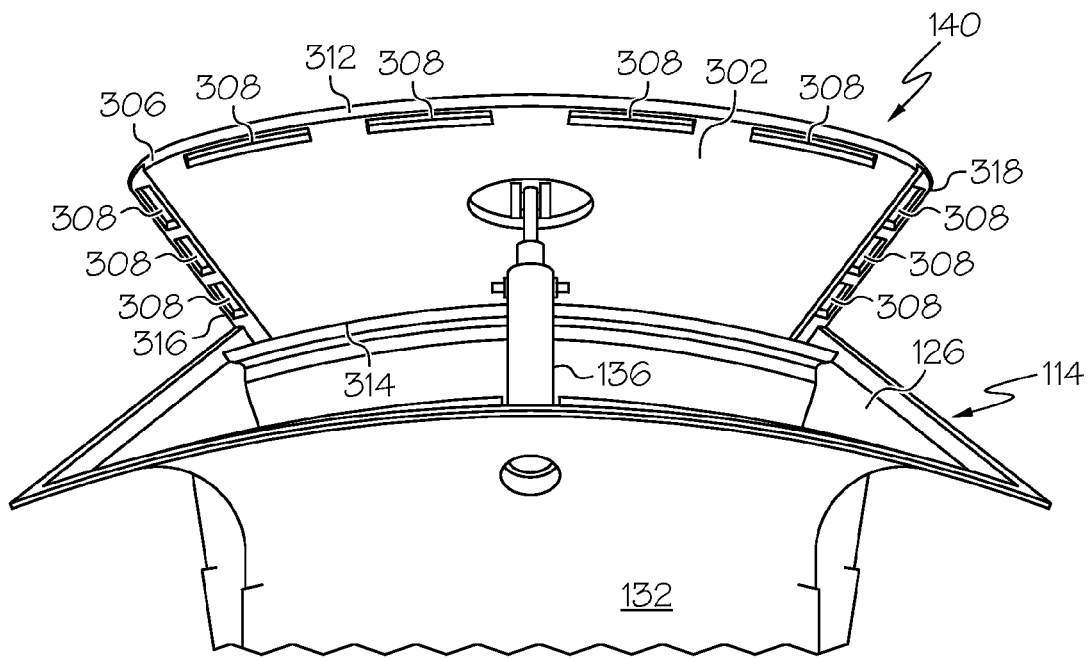
FIGS. 3-7 depict various embodiments of an inlet door that may be used in the aircraft of FIG. 1.

With reference now to FIG. 2, an exemplary embodiment of the APU 110 is depicted. The exemplary APU 110 includes a compressor 202, a combustor 204, and a turbine 206. Air is directed into the compressor 202 via an APU air inlet 208. The compressor 202 raises the pressure of the air and supplies compressed air to both the combustor 204 and, in the depicted embodiment, to a bleed air outlet port 210. In the combustor 204, the compressed air is mixed with fuel that is supplied to the combustor 204 from a non-illustrated fuel source via a plurality of fuel nozzles 212. The fuel/air mixture is combusted, generating high-energy gas, which is then directed into the turbine 206.

The high-energy gas expands through the turbine 206, where it gives up much of its energy and causes the turbine 206 to rotate. The gas is then exhausted from the APU 110 via an exhaust gas outlet nozzle 214. As the turbine 206 rotates, it drives, via a turbine shaft 216, various types of equipment that may be mounted in, or coupled to, the APU 110. For example, in the depicted embodiment the turbine 206 drives the compressor 202. It will be appreciated that the turbine 206 may also be used to drive a generator and/or a load compressor and/or other rotational equipment, which are not shown in FIG. 2 for ease of illustration.

Returning once again to FIG. 1, it is seen that the APU 110, and more specifically the APU air inlet 208, is coupled to a duct 114. It is additionally seen that the APU 110, and more specifically the exhaust gas outlet nozzle 214, is coupled to an exhaust system 115. As will be described in more detail below, the duct 114 is coupled to selectively receive the inlet air 109. The exhaust system 115, at least in the depicted embodiment, includes an eductor 116 and an outlet duct 118. The eductor 116 may be variously configured, but in the depicted embodiment it preferably surrounds, and receives the gas that is exhausted from, the exhaust gas outlet nozzle 214. It will be appreciated that in other embodiments, the exhaust gas outlet nozzle 214 may communicate with the eductor 116 via one or more intermediate components such as, for example, a mixer. Nonetheless, the eductor 116 is additionally configured, upon receipt of the exhaust gas, to draw compartment cooling air that, in some embodiments, is selectively supplied to the APU compartment 102 from a compartment cooling duct 122 through, for example, an oil cooler 124 that is coupled to the eductor 116, and into the exhaust duct 118, which is coupled to, and in fluid communication with, the exhaust opening 112.

As was mentioned above, the duct 114 is coupled to selectively receive the inlet air 109. To do so, the duct 114 is coupled to and extends from the APU air inlet 208, and includes an inlet port 126, an outlet port 128, and a duct sidewall 132. The inlet port 126 is coupled to selectively receive the inlet air flow 109, and the outlet port 128 is coupled to the APU air inlet 208. The duct sidewall 132 extends between the inlet port 126 and the outlet port 128, and defines an air flow passage 134 between the inlet port 126 and the outlet port 128.

As FIG. 1 also depicts, an inlet door 140 is provided and is used to selectively allow the inlet air 109 to ingress into the duct 114. The inlet door 140 is rotationally coupled to the duct 114 (or other static structure) and is configured to selectively rotate between a closed position and a plurality of open positions. In the closed position, the door 140 seals, and thus prevents air flow into, the inlet port 126. In any one of the open positions, the door 140 does not seal the air inlet 126 and thus allows the inlet air 109 to flow into the inlet port 126. The inlet door 140 is rotated via an actuator 136. The actuator 136 is coupled to the inlet door 140 and is configured to selectively rotate the inlet door 140 between the closed position and an open position. The actuator 136 may be implemented using any one of numerous types of pneumatic, hydraulic, or electric actuators. The actuator 136 may also be located at various locations relative to the inlet duct 114. For example, it may be located in front of the inlet duct 114 or behind the inlet duct 114, just to name two alternate locations. Various embodiments of the inlet door are depicted in FIGS. 3-7, and will now be described, beginning with the embodiment depicted in FIGS. 3 and 4.

The inlet door 140 includes an inner surface 302, an outer surface 304, and an outer peripheral edge 306 that is defined between the inner and outer surfaces 302, 304. In the depicted embodiment, the actuator 136 is coupled to the inner surface 302 of the inlet door 140. It will be appreciated, however, that in other embodiments the actuator 136 may be coupled to various other portions of the inlet door 140. As FIGS. 3 and 4 also depict, a plurality of openings 308 extend through the inlet door 140 between the inner and outer surfaces 302, 304, and are disposed adjacent to the outer peripheral edge 306.

It will be appreciated that the number, size, shape, spacing, and location of the openings 308 in the outer peripheral edge 306 of the inlet door 140 may vary. In the depicted embodiment, in which the outer peripheral edge 306 is defined by a front edge 312, a back edge 314, a first side edge 316, and a second side edge 318, the openings 308 are disposed adjacent to only the front edge 312, the first side edge 316, and the second side edge 318. It is additionally seen, at least in the depicted embodiment, that the openings 308 that are disposed adjacent to the front edge 312 are spaced evenly, the openings 308 disposed adjacent to the first side edge 316 are spaced evenly, and the openings 308 disposed adjacent to the second side edge 318 are spaced evenly. Although the depicted embodiment includes four evenly spaced openings 308 disposed adjacent to the front edge 312, and three openings disposed adjacent to each of the first and second side edges 316, 318, this is merely exemplary of one embodiment. In other embodiments, the number of openings may vary. Moreover, although the depicted openings 308 are shaped as rectangular slots, this shape is merely exemplary and may vary as needed or desired. For completeness, some non-limiting examples of alternative shapes are depicted in FIGS. 9-14

Figure 4:
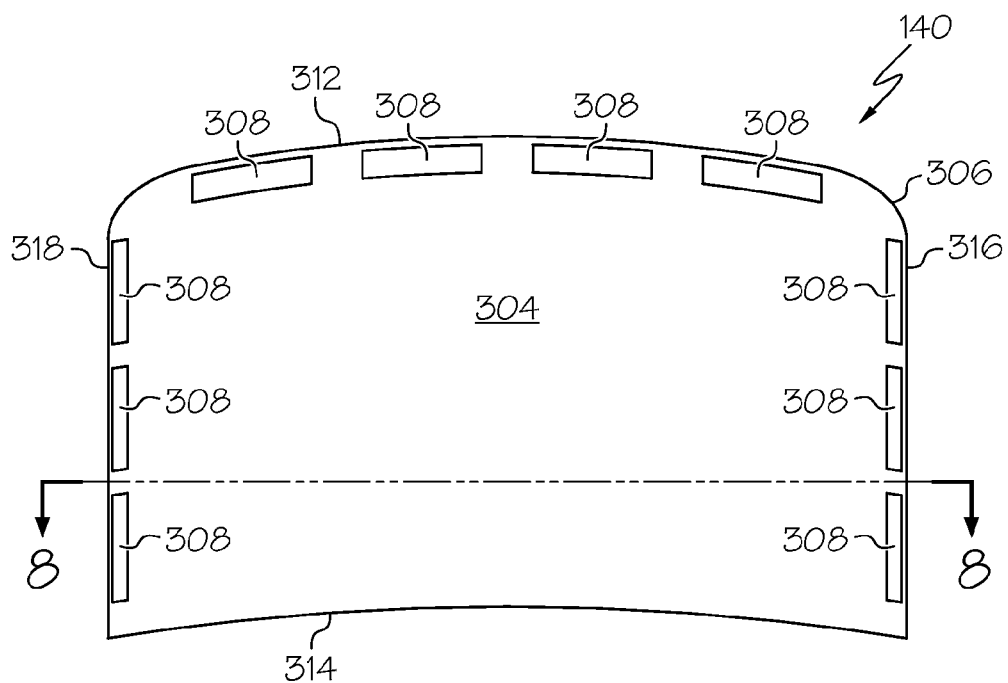
Figure 5:
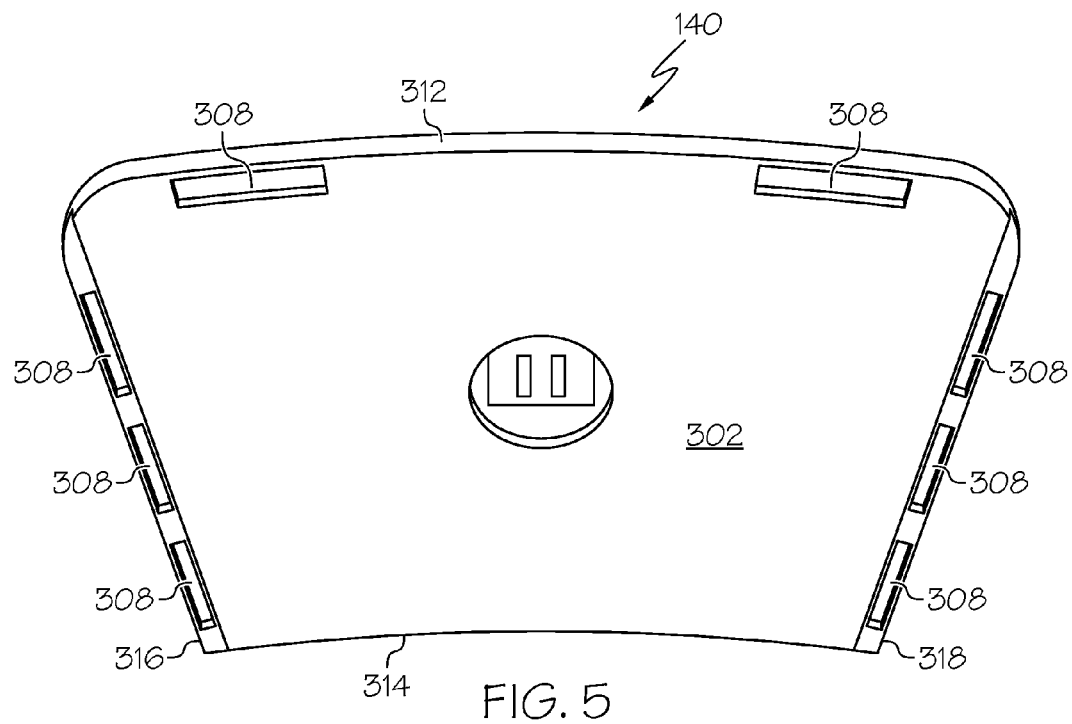

Referring now to FIG. 5, the alternative embodiment depicted therein also includes openings 308 that are disposed adjacent to only the front edge 312, the first side edge 316, and the second side edge 318. However, in this embodiment, the openings 308 disposed adjacent to the first side edge 316 are spaced evenly, and the openings 308 disposed adjacent to the second side edge 318 are spaced evenly. Conversely, the openings 308 disposed adjacent to the front edge 312 are not evenly spaced. Similar to the embodiment depicted in FIGS. 3 and 4, the inlet door 140 includes three openings 308 disposed adjacent to each of the first and second side edges 316, 318. Unlike that embodiment, the inlet door 104 includes only two openings 308, rather than four, disposed adjacent to the front edge 312. Again, this is merely exemplary of one alternative embodiment, and in other embodiments the number and shapes of the openings 308 may vary.

Figure 6:
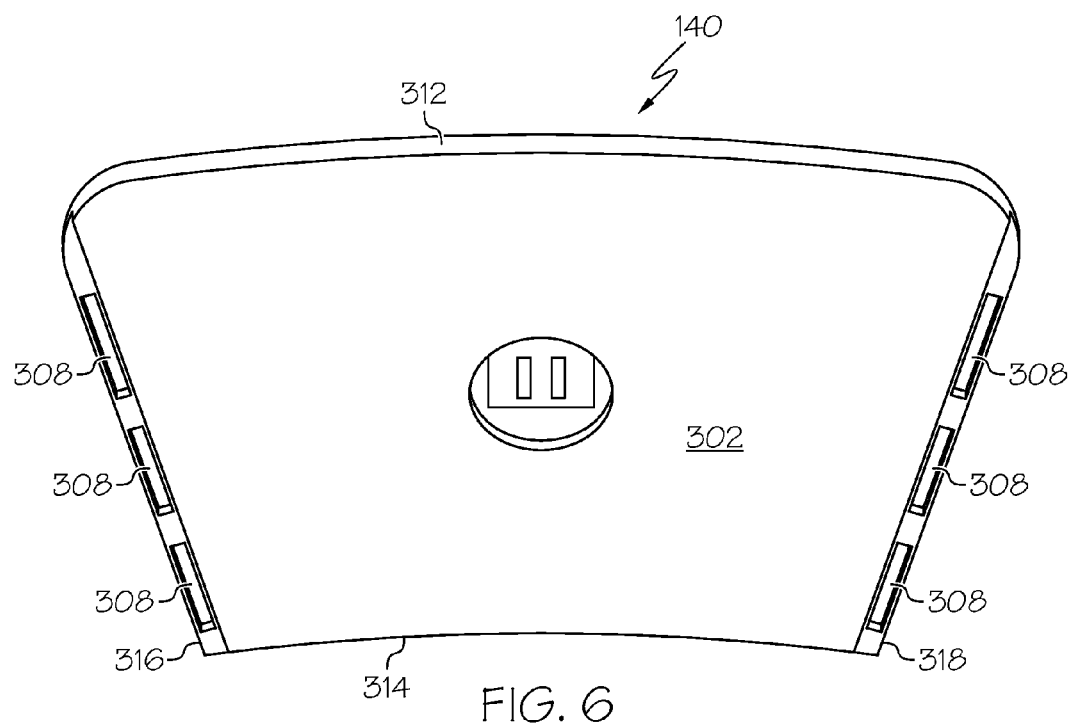

In yet another alternative embodiment, which is depicted in FIG. 6, the inlet door 140 includes openings 308 that are disposed adjacent to only the first and second side edges 316, 318, with no openings 308 disposed adjacent to the front or back edges 312, 314. The openings 308 disposed adjacent to the first and second side edges 316, 318 are spaced evenly. Again, although the inlet door 140 includes three openings 308 disposed adjacent to each of the first and second side edges 316, 318, this is merely exemplary of one alternative embodiment, and in other embodiments the number and shapes of the openings 308 may vary.

Figure 7:
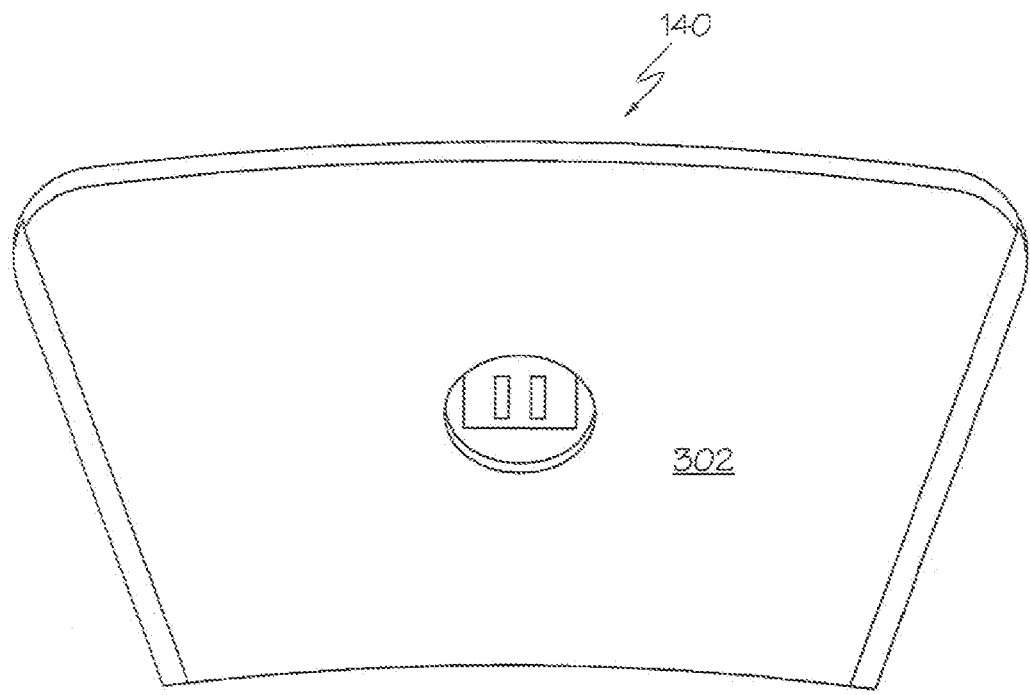

Regardless of the number, size, shape, spacing, and location of the openings 308, in each of the depicted embodiments the inlet door 140 also does not include any side members. In particular, conventionally known inlet doors 140 typically include a plurality of side members that extend from the inner surface 302 and into the air flow passage 134 when the inlet door 140 is in the closed position. The side members, when included, help to control airflow spillage around the inlet door 140 and minimize the loss of pressure in the airflow entering into the inlet port 126. In one other embodiment, which is depicted in FIG. 7, the inlet door 140 is implemented without side members and also includes no openings 308.

Figure 8:
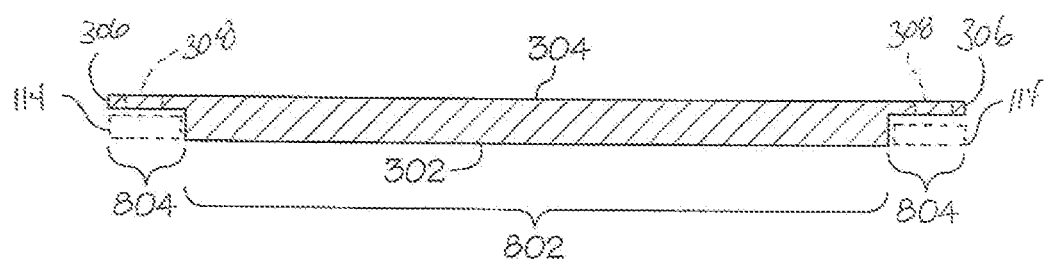
FIG. 8 depicts a cross section view of the inlet door taken along line 8-8 in FIG. 4.
Figure 9:
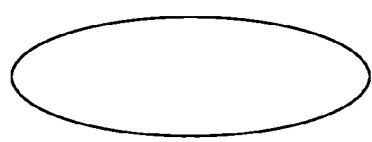
FIGS. 9-14 depict various examples of alternative shapes of openings that are formed in the inlet door.
Figure 10:
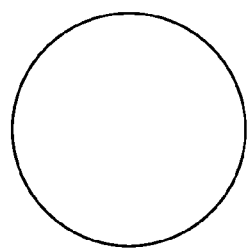
Figure 11:
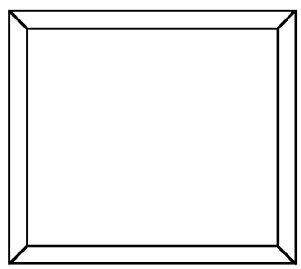
Figure 12:
Figure 13:
Figure 14:
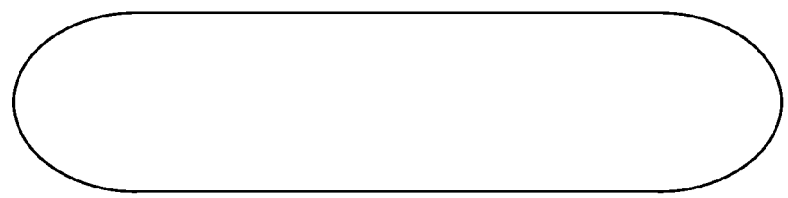

With reference now to FIG. 8, which depicts a cross section view of the inlet door taken along line 8-8 in FIG. 4, it should be noted that each of inlet doors 140 depicted in FIGS. 3-7 also include an insert portion 802 and a seal portion 804. The insert portion 802 is configured to extend through the inlet port 126 and is disposed within the air flow passage 134 when the inlet door 140 is in the closed position. The seal portion 804 is disposed outward of the insert portion 802 and inward of the outer peripheral edge 306. When the inlet door 140 is in the closed position, the seal portion 804 sealingly engages the duct 114, and preventing the openings 308 from providing an open pathway to the inlet port 126 and air flow passage 134. Governmental agency requirements specify that the air flow passage 134 be completely sealed from the outside when the door 140 is closed. It will be appreciated that this is merely exemplary of one embodiment of an inlet door 140. Regardless, in each of the depicted embodiments, the openings 308 are disposed such that each extends through the seal portion 804.

The inlet door 140 embodiments disclosed herein that include the openings 308, and that are implemented without side members, exhibit significant reductions in door loads, while not significantly impacting the flow of inlet air 109 into the duct 114. Indeed, with the embodiment depicted in FIGS. 3 and 4, the inlet door 140 exhibits a reduction in door load of about 13% as compared to conventionally known doors. The embodiment depicted in FIG. 5 exhibits a reduction in door load of about 12% as compared to conventionally known doors; the embodiment depicted in FIG. 6 exhibits a reduction in door load of about 9% as compared to conventionally known doors; and the embodiment depicted in FIG. 7 exhibits a reduction in door load of about 6% as compared to conventionally known doors. It should be noted that reductions of this magnitude were wholly unexpected.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An inlet door system for providing air to at least an auxiliary power unit (APU) contained within an aircraft, the inlet door system comprising:
   a duct configured to extend from the auxiliary power unit (APU) to an intake opening formed in an outer surface of the aircraft, the duct including an inlet port, an outlet port, and a duct sidewall extending between the inlet port and the outlet port, the duct sidewall defining an air flow passage between the inlet port and the outlet port;
   an inlet door including an inner surface, an outer surface, and an outer peripheral edge between the inner and outer surfaces, the outer peripheral edge of the inlet door is defined by a front edge, a back edge, a first side edge, and a second side edge, the inlet door rotationally coupled to the duct, the inlet door configured to selectively rotate between (i) a closed position, in which the inlet door seals the air inlet port and prevents air flow into the inlet port, and (ii) a plurality of open positions, in which the inlet door does not seal the air inlet and allows air flow into the inlet port; and a plurality of openings extending through the inlet door between the inner surface and the outer surface, each opening disposed adjacent to only the first side edge and the second side edge.

2. The system of claim 1, wherein:

the openings disposed adjacent to the first side edge are spaced evenly, and the openings disposed adjacent to the second side edge are spaced evenly.

3. The system of claim 1, wherein the inlet door comprises:

an insert portion that extends through the inlet port and is disposed within the air flow passage when the inlet door is in the closed position; and a seal portion disposed outward of the insert portion and inward of the outer peripheral edge, the seal portion engaging the inlet duct when the inlet door is in the closed position.

4. The system of claim 3, wherein the openings extend through the seal portion.

5. The system of claim 1, further comprising:

an actuator coupled to the inlet door and configured to selectively move the inlet door between the closed position and one or more of the open positions.

6. An inlet door system for providing air to at least an auxiliary power unit (APU) contained within an aircraft, the inlet door system comprising:

a duct configured to extend from the auxiliary power unit (APU) to an intake opening formed in an outer surface of the aircraft, the duct including an inlet port, an outlet port, and a duct sidewall extending between the inlet port and the outlet port, the duct sidewall defining an air flow passage between the inlet port and the outlet port;

an inlet door including an inner surface, an outer surface, and an outer peripheral edge between the inner and outer surfaces, the outer peripheral edge defined by a front edge, a back edge, a first side edge, and a second side edge, the inlet door rotationally coupled to the duct, the inlet door configured to selectively rotate between (i) a closed position, in which the inlet door seals the air inlet port and prevents air flow into the inlet port, and (ii) a plurality of open positions, in which the inlet door does not seal the air inlet and allows air flow into the inlet port;

an actuator coupled to the inlet door and configured to selectively move the inlet door between the closed position and one or more of the open positions; and a plurality of openings extending through the inlet door between the inner surface and the outer surface, each of the openings disposed adjacent to only the front edge, the first side edge, and the second side edge.

7. The system of claim 6, wherein:

the openings disposed adjacent to the front edge are spaced evenly, the openings disposed adjacent to the first side edge are spaced evenly, and the openings disposed adjacent to the second side edge are spaced evenly.

8. The system of claim 6, wherein the inlet door comprises:

an insert portion that extends through the inlet port and is disposed within the air flow passage when the inlet door is in the closed position; and a seal portion disposed outward of the insert portion and inward of the outer peripheral edge, the seal portion engaging the inlet duct when the inlet door is in the closed position.

9. The system of claim 8, wherein the openings extend through the seal portion.

10. The system of claim 6, further comprising:

an actuator coupled to the inlet door and configured to selectively move the inlet door between the closed position and one or more of the open positions.

* * * * *